G. RANK.
Seed Sower.
No. 84,375.
Patented Nov. 24, 1868.
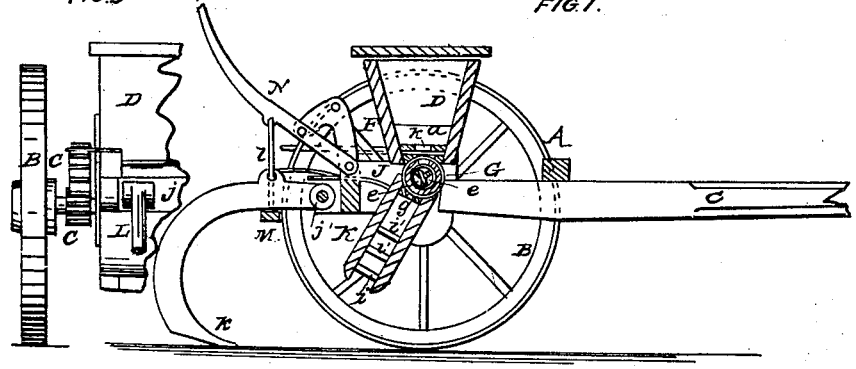
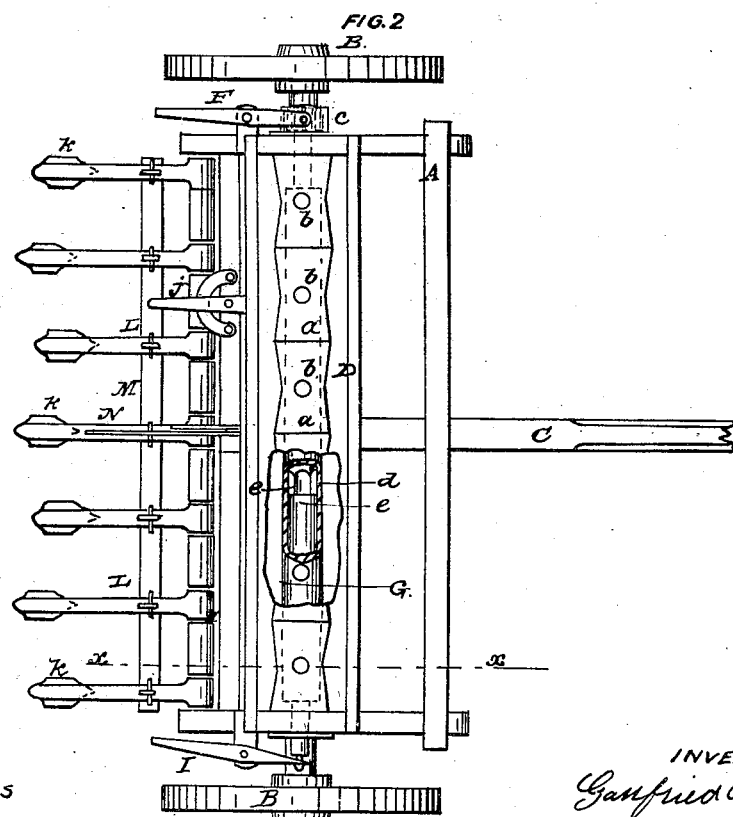

GOTTFRIED RANK, OF GREENLEAF, MINNESOTA.

Letters Patent No. 84,375, dated November 24, 1868.

IMPROVEMENT IN SEED-SOWER.

The Schedule referred to in these Letters Patent and making part of the same.

To all whom it may concern:

Be it known that I, GOTTFRIED RANK, of Greenleaf, in the county of Meeker, and State of Minnesota, have invented a new and improved Seed-Sower; and I do hereby declare that the following is a full, clear, and exact description thereof, which will enable those skilled in the art to make and use the same, reference being had to the accompanying drawings, forming part of this specification.

This invention relates to a new and improved machine for sowing seed broadcast; and It consists in a means for scattering the seed, and protecting the same from the action of the wind while being sown or scattered upon the ground.

The invention also consists in an improved seed-distributing device, by which a greater or less quantity of seed may be sown on a given area, as required, and seeds of different sizes sown with one and the same machine.

In the accompanying sheet of drawings—

Figure 1 is a side sectional view of my invention, taken in the line x x, fig. 2.

Figure 2, a plan or top view of the same.

Figure 3, a rear view of a portion of the same.

Similar letters of reference indicate corresponding parts.

A represents a suitable frame, which is mounted on two wheels B B, and is provided with a draught-pole, C.

D is a seed-box, secured on the frame A, and extending its whole width, and having a bottom composed of a series of inclined planes, a, which form a series of concaves, each of which is perforated with a hole, b.

Underneath this bottom there is a perforated slide, E, which may be adjusted by a lever, F, to regulate the flow of seed through the holes b into a cylinder, G, underneath, which extends the whole length of the seed-box, and has a rod, H, within it that is rotated by gears c from the axle of one of the wheels B.

This rod H is allowed a certain degree of longitudinal movement, and is thus moved by a lever, I, for the purpose of admitting of cavities d in the rod being adjusted more or less in line with the holes b, according to the size of the seed, and the quantity to be sown on a given area.

The rod H also, by this longitudinal movement, may be thrown out of gear when desired, and the seed-distributing apparatus rendered inoperative.

The cavities d in the rod H are provided with radial flanges e, as shown clearly in fig. 1, which serve to discharge the seed through openings f, in the lower part of the cylinder G, and through openings g in a slide, h, underneath the cylinder G, the plate h being regulated by a lever, J.

The seed, as it is discharged through the openings g, passes through an inclined narrow box, K, which has a series of rods or pins, i, fitted transversely in it.

These rods or pins serve to scatter the seed, and insure the even scattering or distribution of it upon the ground, while the box K protects the seed from the action of the wind.

L represents a series of curved bars, the upper ends of which are fitted loosely on a rod, j, at the rear of the seed-box.

The lower ends of these curved bars have teeth k, formed on them, which, as the machine is drawn along, furrow up the ground and cover the seed.

M is a bar, placed underneath the bars L, and connected by a link, l, with a lever, N, by raising which, the teeth k may be elevated above the ground when necessary or desired.

I claim as new, and desire to secure by Letters Patent—

1. The seed or wind-protector and scatterer K, in combination with the cylinder G, flanged rod H, and hopper D, substantially as described for the purpose specified.

2. The combination and arrangement of the perforated slides E h, cylinder G, and rotating rod H, provided with cavities d, substantially as and for the purpose set forth.

GOTTFRIED RANK.

Witnesses:
HENRY HILL,
ORANGE S. MILLER.